Dec. 31, 1929.  I. H. ATHEY  1,741,602
CANE HARVESTER
Filed March 6, 1924   8 Sheets-Sheet 1
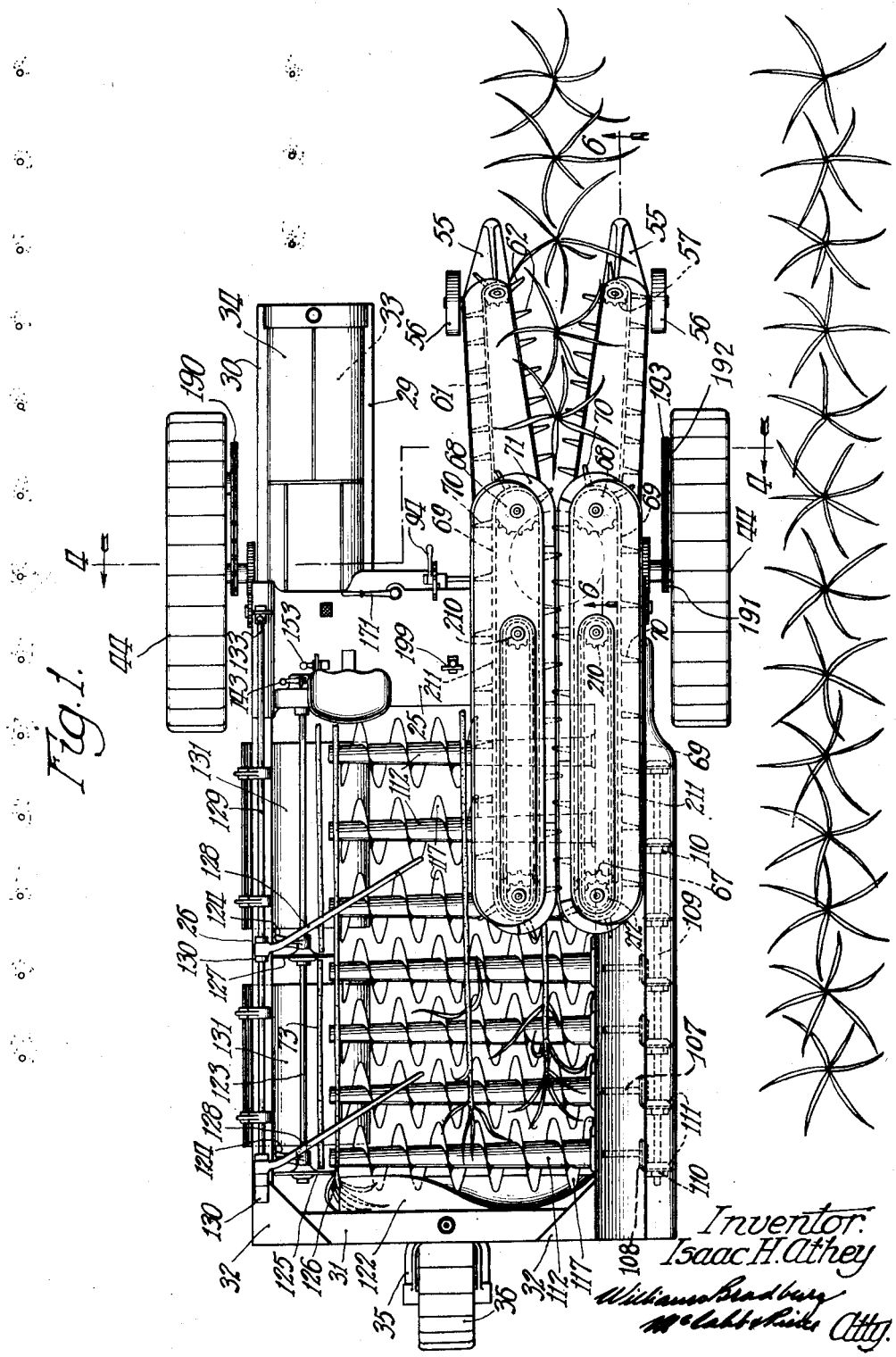
Inventor.
Isaac H. Athey

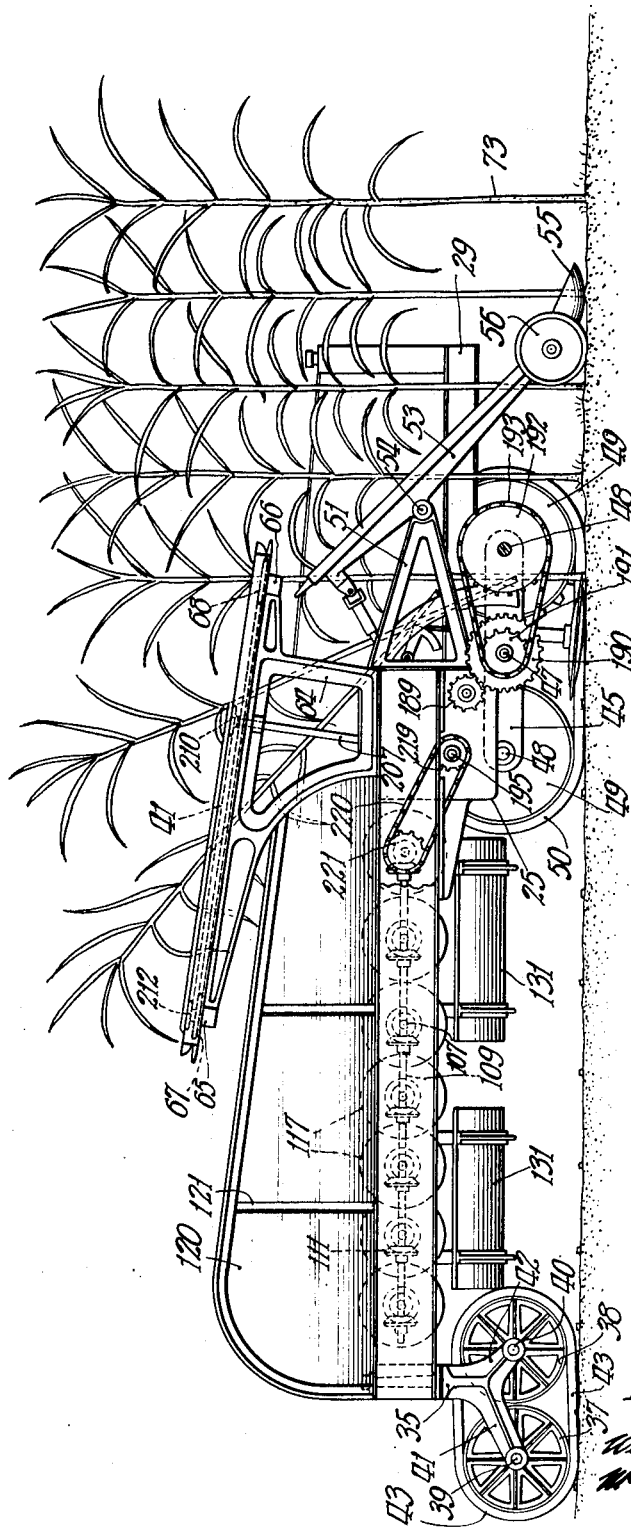

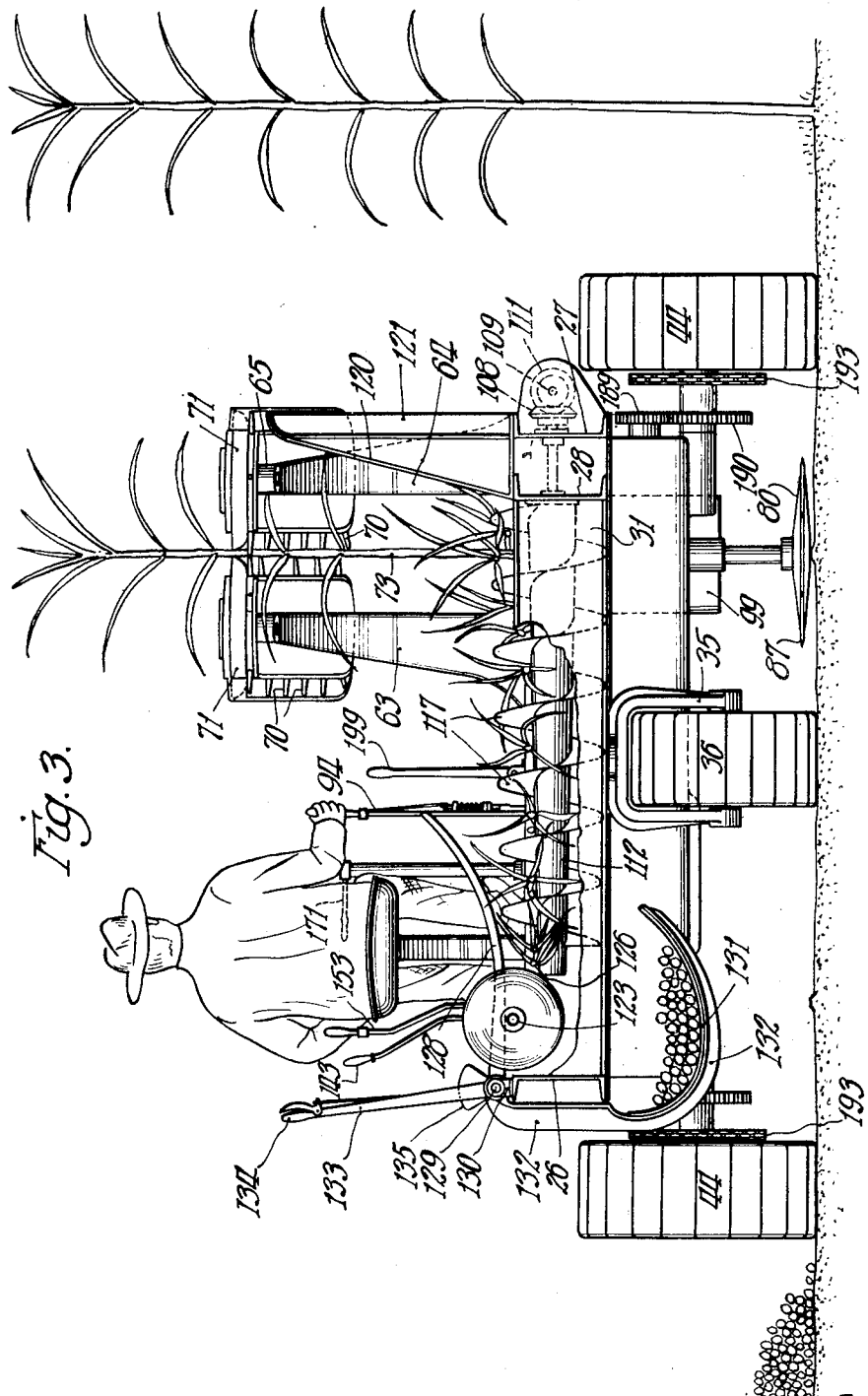

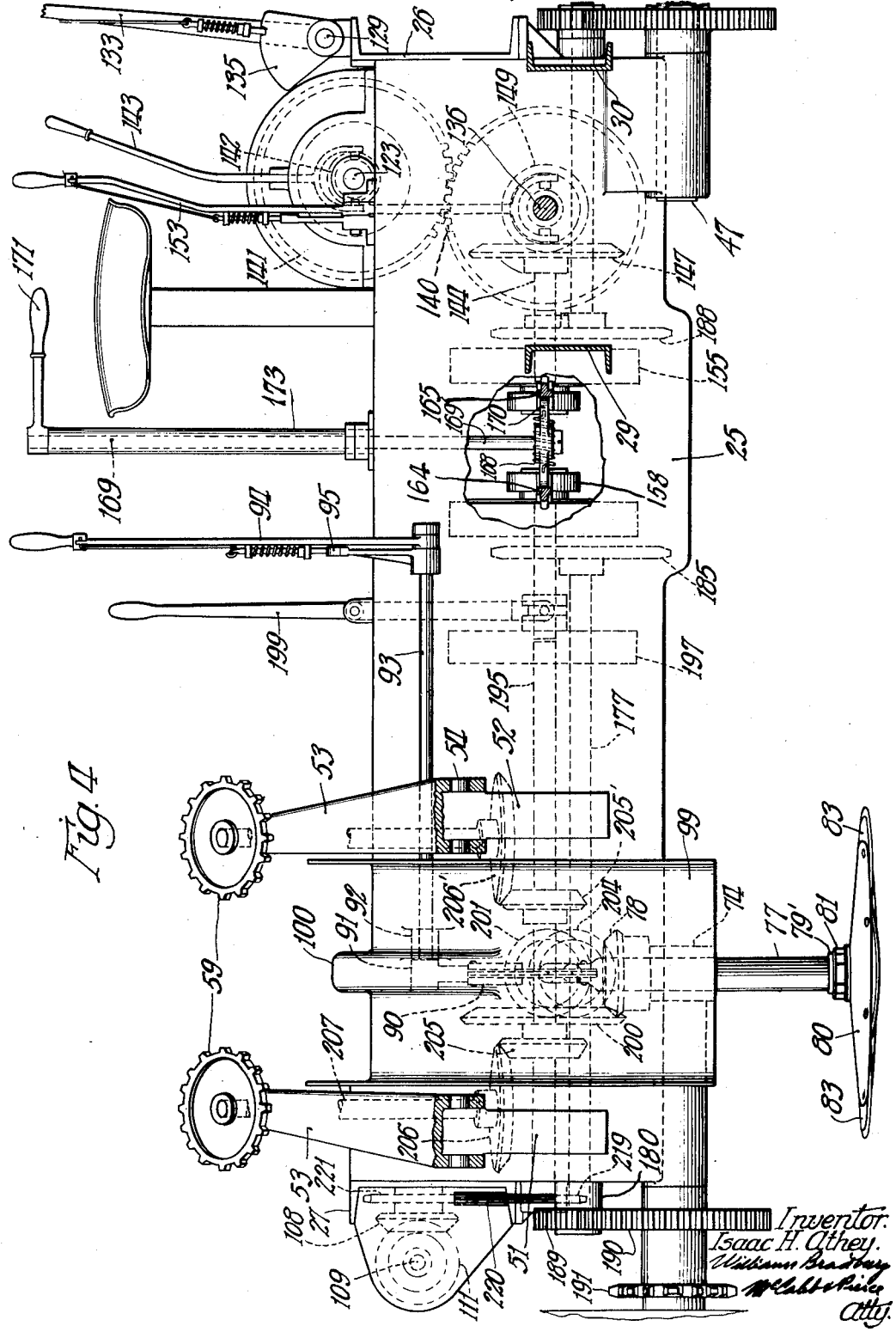

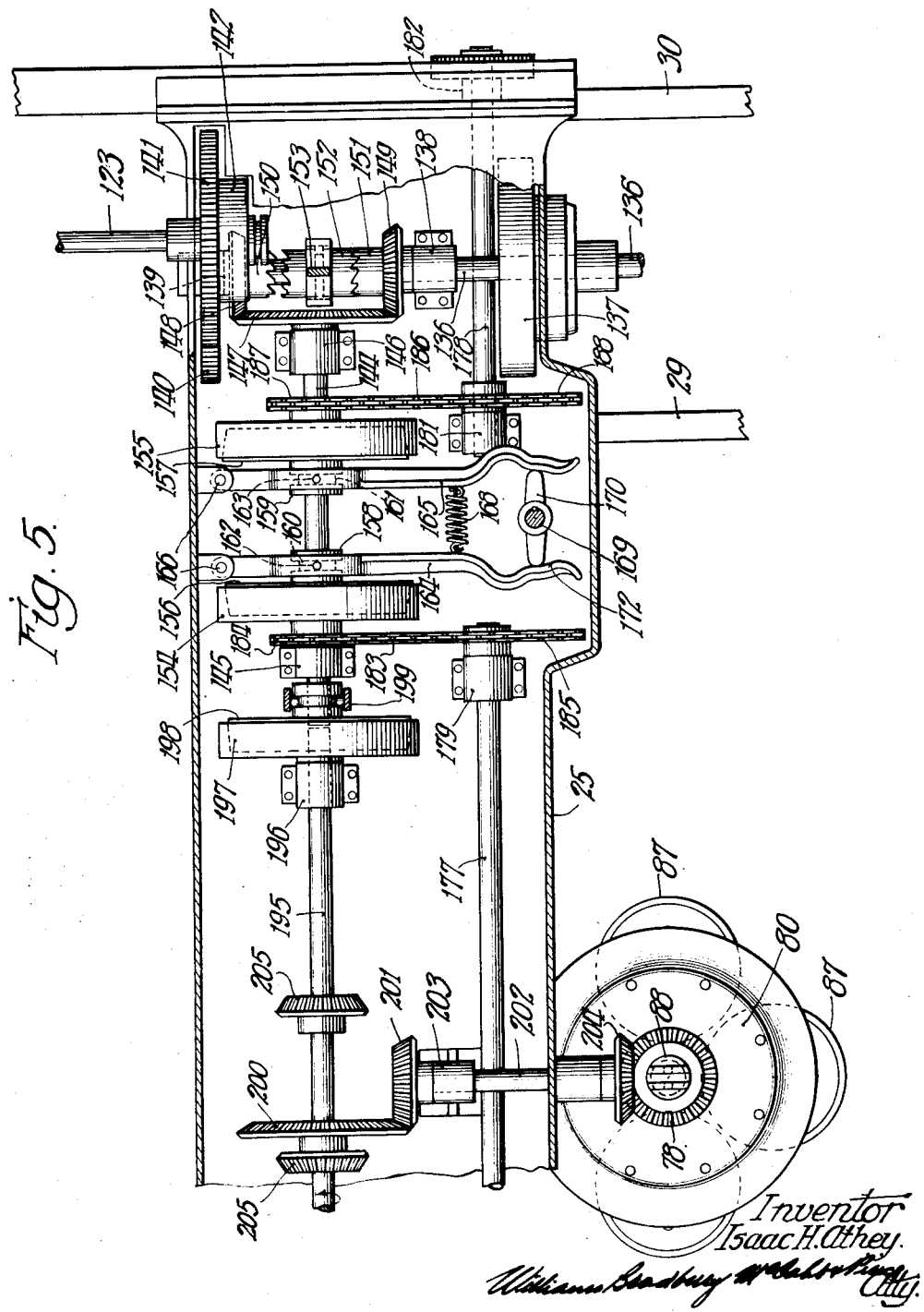

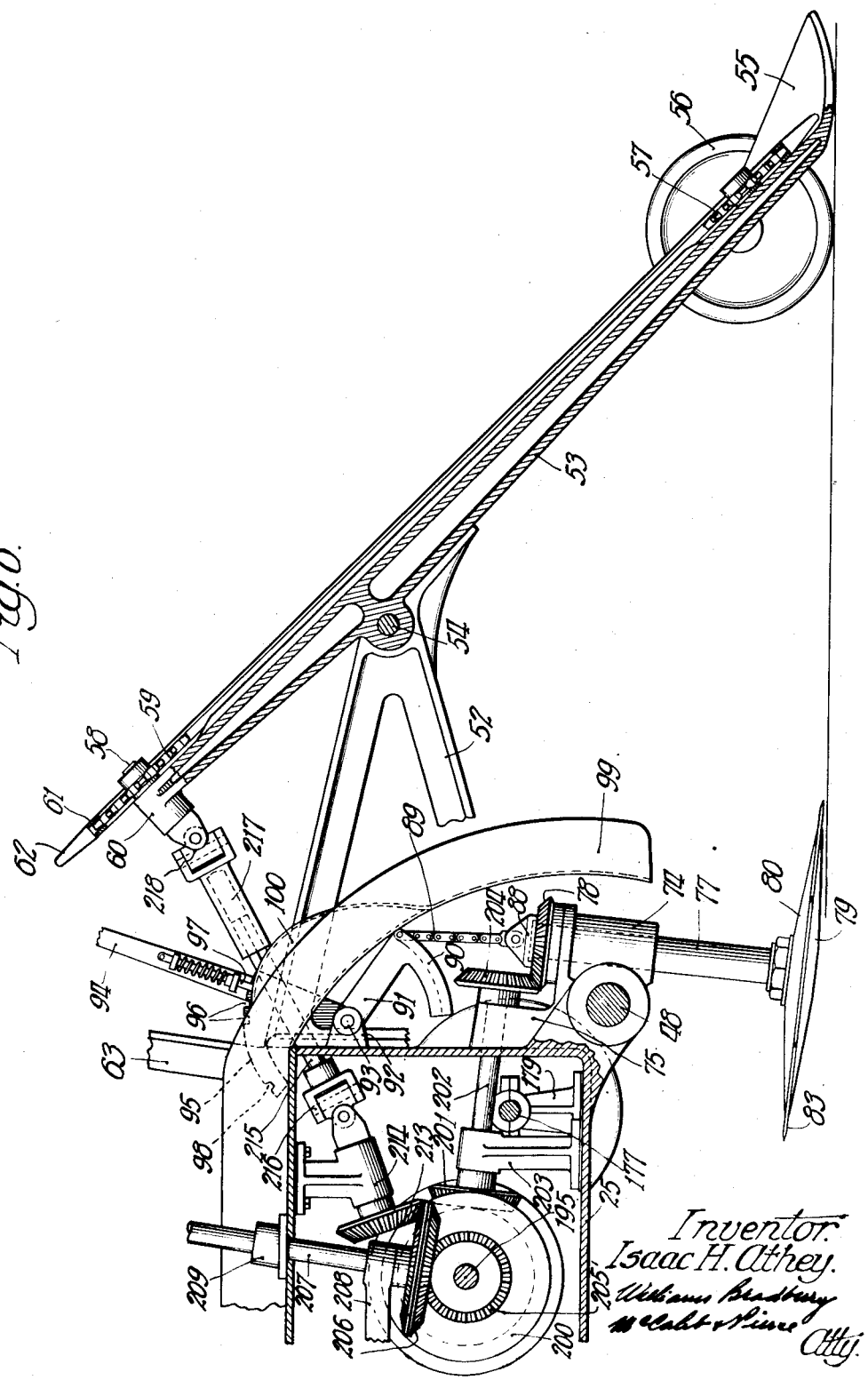

Dec. 31, 1929.   I. H. ATHEY   1,741,602
CANE HARVESTER
Filed March 6, 1924   8 Sheets-Sheet 7
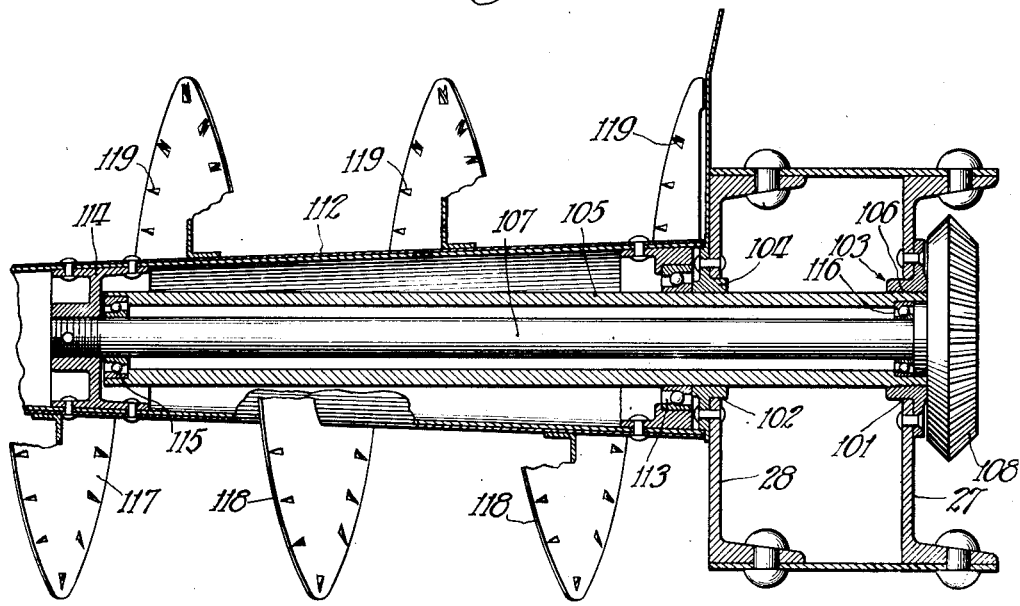
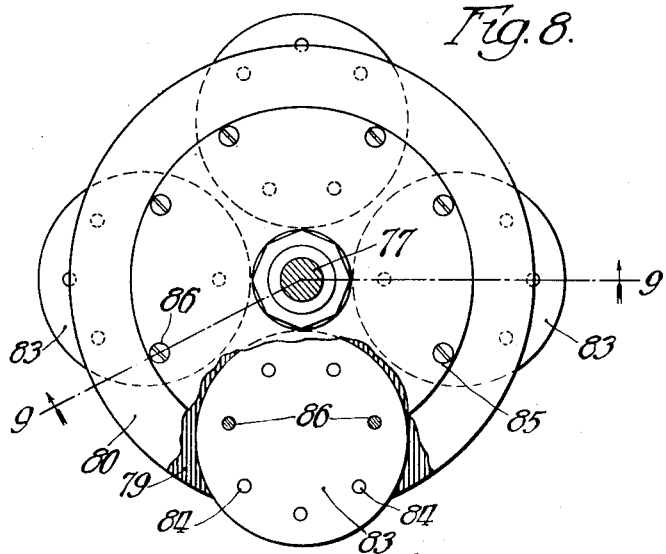
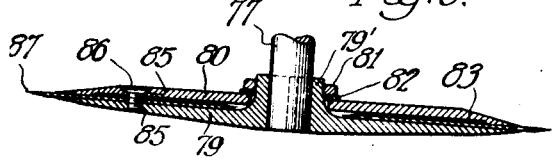
Inventor.
Isaac H. Athey.

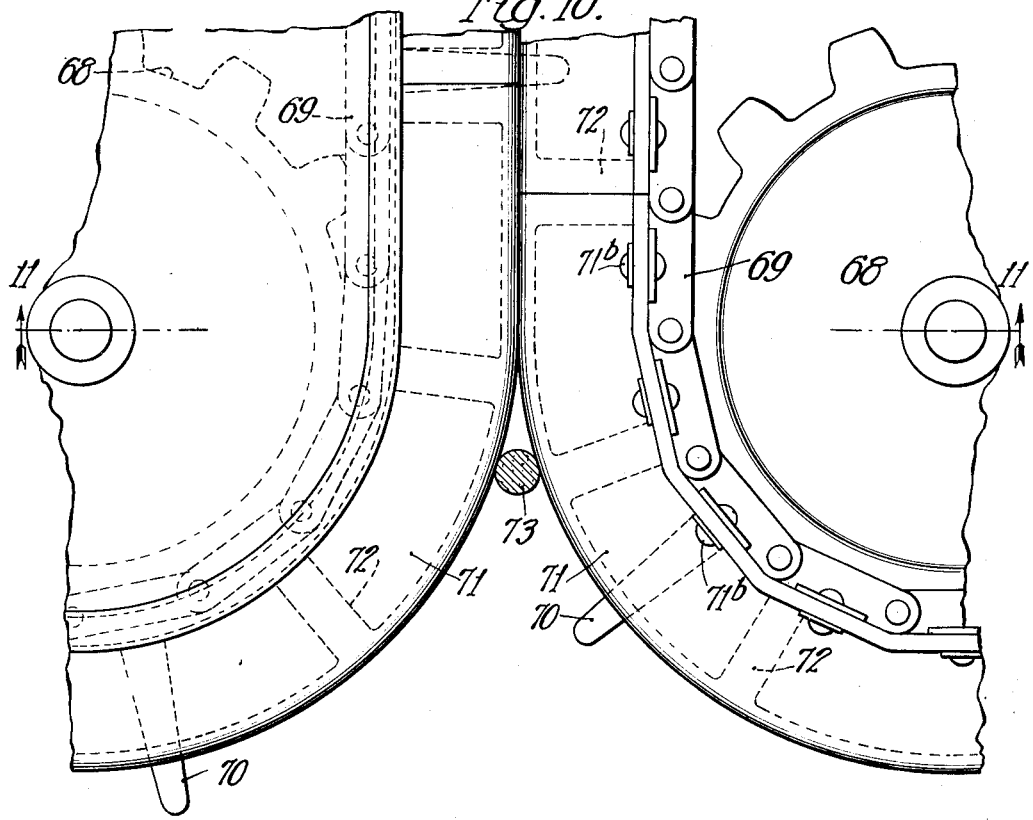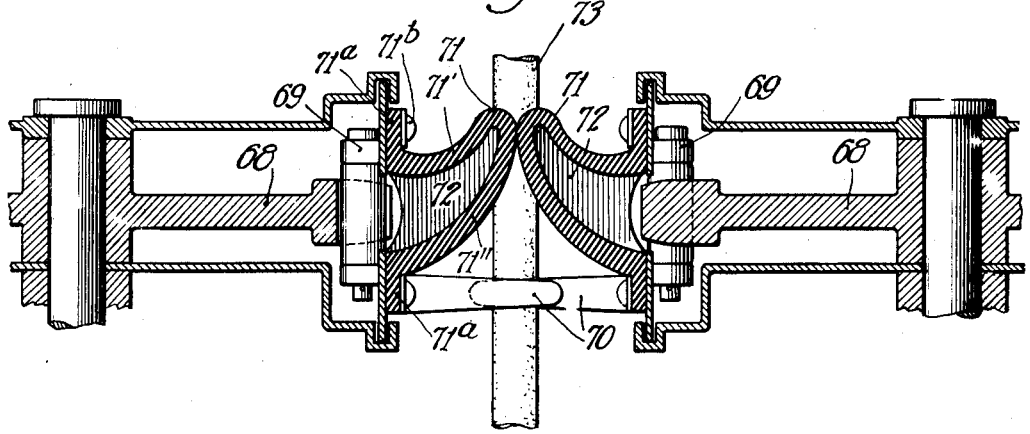

Patented Dec. 31, 1929

1,741,602

UNITED STATES PATENT OFFICE

ISAAC H. ATHEY, OF CHICAGO, ILLINOIS

CANE HARVESTER

Application filed March 6, 1924. Serial No. 697,198.

My invention relates to improvements in cane harvesters, and is particularly concerned with the provision of a cane harvester by means of which the operations of cutting cane, stripping the leaves therefrom, topping, and cutting the cane into lengths suitable for transportation are automatically accomplished.

At the present time the harvesting of cane is accomplished almost universally by manual labor. In harvesting cane, the laborer first strips the leaves from the stalks of cane by one or two strokes of the knife and then severs it from the roots. Another stroke of the knife removes the bunch of leaves at the top of the stalk and the following stroke cuts the stalk into two lengths which can be easily handled during the transportation and milling operations.

There is a certain period in the growth of cane when, if the cane is harvested during that period, the largest possible percentage of sugar can be obtained, but if the cane is permitted to stand subsequent to this period, the percentage of sugar which it is possible to obtain decreases, so that it is extremely desirable to harvest the cane during this period when the percentage of sugar obtainable is the greatest.

Recently, very considerable difficulty has been experienced by cane plantation owners in procuring a sufficient number of laborers to harvest the cane, and, as a result, not only have large quantities of sugar been lost through inability to harvest the cane at the proper time, but the price of labor has increased very materially, thereby adding to the cost of the sugar.

Recently, mechanical harvesters of certain types have been constructed and used for harvesting cane, but have proved unsatisfactory in some respects due to their great size and weight, and to their complicated construction. Furthermore, these machines require a number of operators and mechanics to keep them in operation, and difficulty has been experienced in keeping them in operative condition. The large initial cost of these machines is also an item which prevents the universal adoption of such machines.

The objects of my present invention are:

First, to provide a mechanical cane harvester in which the operations performed by the manual harvester are efficiently performed, so that when the cane is discharged from the harvester, it is in the form of lengths suitable for transportation and milling operations, freed from the leaves and the tops;

Second, to provide a cane harvester which is comparatively light in weight, and which requires a comparatively small amount of power for its operation;

Third, to provide a cane harvester, all the operations of which can be controlled by one or two operators;

Fourth, to provide a cane harvester which will successfully handle cane stalks of different heights;

Fifth, to provide a cane harvester such as described embodying means for stripping the leaves from the stalks, which means is permanent in character and not liable to be rendered inoperative by becoming clogged with the leaves stripped from the cane, and Sixth, to provide a cane harvester of the character described which is comparatively simple in construction, economical to manufacture and operate, and reliable in its operations.

Other objects of my invention will appear as this description progresses, reference being had to the accompanying drawings which illustrate one embodiment of my invention, and in which Figure 1 is a plan view of my improved cane harvester;

Figure 2 is a side elevation thereof;

Figure 3 is a rear end view;

Figure 4 is a transverse section taken on line 4—4 of Figure 1, certain parts thereof being broken away for the purpose of better illustration;

Figure 5 is a plan view of a portion of the transmission mechanism shown in Figure 4 with certain parts broken away for the purpose of better illustration;

Figure 6 is an enlarged sectional detail taken on line 6—6 of Figure 1;

Figure 7 is an enlarged sectional detail showing the construction and mounting of the spiral conveyors forming a part of my invention;

Figure 8 is a plan view of my improved cutting knife or saw;

Figure 9 is a transverse section taken on line 9—9 of Figure 8;

Figure 10 is an enlarged plan view showing certain details of construction of one of the conveyors forming a part of my harvester; and Figure 11 is a transverse section taken on line 11—11 of Figure 10.

Similar reference characters will be used in the several figures for referring to similar parts, and the sections are taken looking in the directions of the small arrows.

The embodiment of my invention disclosed herein comprises a frame which is formed by the hollow box-like transmission housing 25 which extends transversely of the harvester, the rearwardly extending frame members 26, 27 and 28, and the forwardly extending frame members 29 and 30. The end frame member 31 connects the rear ends of the frame members 26, 27 and 28, and may be provided with suitable gussets 32 and any other braces found desirable or necessary for connecting and sustaining these frame members. The forward end of the frame member 26 is connected to one end of the housing 25, and the forward ends of the frame members 27 and 28 are connected to the other end of the housing 25. The rear ends of the frame members 29 and 30 are also connected with and supported by the transmission housing 25. These frame members support the driving engine 33, which may be provided with a suitable hood 34.

A yoke 35 is pivotally secured to the rear end frame member 31, and is supported by a traction element 36 which is preferably of the endless belt type. This element may comprise the two wheels 37 and 38, the shafts 39 and 40 of which are journaled in the bifurcations 41 and 42, respectively, at the lower ends of each side of the yoke 35. The endless belt 43 may be of any suitable construction, such as is well known to those skilled in the art. The elements just described form a caster construction for the rear end of the harvester which facilitates the guiding of the harvester and the turning thereof.

The forward end of the harvester is supported by two traction elements 44, which may be of any suitable or desired construction, but each of which is here illustrated as comprising a beam 45, which is pivotally mounted upon stub shafts 47 projecting from the adjacent ends of the transmission housing 25. A shaft 48 is journaled in each end of the beam 45 and is supported by wheels 49. The leading wheel is, as shown, a sprocket wheel adapted to coact with the endless belt 50, of any suitable construction, which passes around the two wheels 49 of each of the traction elements. The means for driving the traction elements just described will later on be explained in detail in connection with the transmission mechanism.

A pair of brackets 51 and 52 extends forwardly from the front side of the transmission housing 25. A supporting beam 53 is pivotally mounted upon the forward end of each of the supporting brackets 51 and 52 by means of a suitable pivot pin 54, or in any other suitable manner. These supporting means diverge from each other in a forward direction, and each of them is provided at its front end with a suitable shoe 55 and a supporting wheel 56. The shoes 55 not only serve to support the front ends of the beams 53, and to cause them closely to follow the contour of the ground, but also act for lifting and straightening the stalks of cane which may be bent over.

A sprocket wheel 57 is rotatably mounted upon the lowermost end of each beam 53, and a shaft 58 carrying another sprocket wheel 59 is journaled in a suitable bearing 60 carried by the upper end of each beam 53. A sprocket chain 61 passes around each pair of sprocket wheels 57—59, and is provided at intervals with flights 62 which are adapted to engage the stalks of cane and prevent them from being thrown forwardly by the forward movement of the harvester, and which also lift leaning stalks of cane to a substantially vertical position. The means for driving the sprocket chains 61 will be described later on, but it should be understood that the connections between the motor 33, the traction elements 44, and the sprocket chains 61 are such that the horizontal component of the speed of the flights 62 of the sprocket chains 61 will be equal, but in an opposite direction to the movement of the harvester.

A second pair of brackets 63 and 64 extends upwardly from the transmission housing 25. Each of these brackets is extended longitudinally of the harvester to provide bearing supports 65 and 66 for the sprocket wheels 67 and 68, respectively. A sprocket chain 69 passes around each pair of sprocket wheels 67 and 68, and at intervals these sprocket chains are provided with flights 70. The flights of one sprocket chain are staggered with relation to the flights of the other sprocket chain, as shown in Figure 1.

In addition to the sprocket chains 69 and the flights 70, I provide an endless friction band 71 for each of the pairs of sprocket wheels 67—68. These bands are hollow, but provided at intervals with webs 72 for strengthening them. The top sides of the bands are somewhat concaved in cross section, as shown at 71, and the lower sides are convexed, as shown at 71″, so that when a stalk of cane 73 (see Fig. 11) is grasped between the two bands, there is a tendency for the contacting edges of the two bands to move upwardly and carry the stalk of cane with them. This is of value in that the stalks of cane are severed from the roots thereof at substantially the same instant that they are grasped by the converging forward edges of the friction bands 71. The width of the flexible bands 71 is such that they can flex sufficiently to accommodate either one, or several stalks at the same time, and they are so conformed that the grip on the stalks increases as the bulk or pull on the stalks increases. The friction bands 71 are provided at their edges with the flanges 71$^a$ which are secured to the links of the sprocket chains 69 by means of rivets 71$^b$, or in any other suitable manner. The upward bias or tendency of the friction bands to lift the stalks slightly in an upward direction tends to insure the clearance of the lower end of the stalks from the severing mechanism, which will now be described.

A bearing block 74 (see Figure 6) is carried upon a bracket 75 projecting from the forward side of the transmission housing 25, and slidably supports the substantially vertically disposed shaft 77. A bevel pinion 78 rests upon the upper end of the bearing 74 and is splined to the shaft 77 so that rotary movement can be communicated to the shaft 77, irrespective of its vertical position. A disc 79 is keyed onto the lower end of the shaft 77. I prefer to bevel the lower face of this disc, as indicated in Figure 9. A second disc 80 has a central opening for receiving the hub 79′ of the disc 79, and may be clamped to the latter disc by means of the nut 81 and lock washer 82. A plurality of cutting discs 83, here shown as being four in number, are clamped between the pair of discs 79—80. Each of these discs is preferably provided with a plurality of openings 84 so arranged that successive pairs of the openings in each disc can be brought into registry with other openings 85 in the discs 79 and 80, in such manner that screws 86 may be inserted through the openings in the discs 79 and 80 and in the cutting discs 83 for holding a portion of the periphery of each cutting disc in a position extending outwardly beyond the peripheries of the discs 79 and 80. The entire periphery of each of the discs 83 is sharpened, as indicated at 87. With the openings in the discs 79, 80 and 83 arranged in the manner shown in Figure 8, the cutting discs can be adjusted on successive days or when desired so as to bring a new portion of the sharpened cutting edge into operative position. With the openings 85 properly arranged, the blades can be given a new cutting edge for each day of the week and then removed for sharpening, or other cutting discs may be substituted for those removed.

It will be noted that the upper face of the disc 80 is gradually beveled inwardly from its edge so that it will not offer an obstruction to the butt ends of the several stalks.

To enable the operator to adjust the cutting element in a vertical direction, so as closely to follow the contour of the ground, and for the further purpose of enabling the cutting element to be lifted quite clear of the ground when the harvester is in motion but not being used for cutting cane, I secure a swiveled cap 88 to the top end of the shaft 77 and connect it by means of a suitable chain 89 with the upper end of the sector 90. This sector is carried by the arm 91 which is pivotally mounted upon the lug 92 projecting from the front side of the transmission housing 25 and can be moved about its shaft 93 by means of the lever 94, which is connected therewith.

For holding the sector 90 in any of its adjusted positions, I provide a second sector 95 which is provided with notches 96 to be engaged by the spring pressed pawl 97 on the lever 94, in a well known manner. This sector may have another notch 98 for receiving the pawl 97 when the cutting element is to be held at a considerable distance above the ground.

The cutting element just described comes into action substantially simultaneously, or just after the cane stalks have been delivered from the inclined conveyors to the substantially horizontal conveyors supported by the brackets 63—64, and immediately upon the severance of the stalks of cane, they are grasped by the flights and friction bands of the horizontal conveyors and successively carried through the positions indicated in Figure 2. During this movement of the stalks, the lower ends thereof slide over the shield 99, which has a raised portion 100 near its center which permits the proper movement of the sector 90.

At spaced intervals, the rearwardly extending frame members 27 and 28 are provided with registering openings 101 and 102, respectively, in which are secured the collars 103 and 104, respectively. Hollow spindles 105 are mounted in the collars 103 and 104, the outer ends of these spindles being engaged with the collars 103 by means of the screw threaded connections 106. These spindles extend toward the frame member 26. In each of the spindles is journaled a shaft 107, to the outer end of which is secured the bevel gear 108. A shaft 109 carried by suitable brackets 110, which are in turn supported by the frame member 27, extends substantially parallel with the frame member 27 and has secured thereto a plurality of bevel gears 111 arranged to drive the bevel gears 108.

A hollow conical supporting member 112 surrounds the inner end of each spindle 105. The outer end of each supporting member 112 is rotatably supported upon its spindle 105 by means of suitable anti-friction bearings 113, and at a point intermediate its ends is connected with the shaft 107 by means of the hub element 114. For reducing friction, anti-friction bearings 115 and 116 are interposed between the shaft 107 and the spindle 105.

From the above description it will be apparent that when the shaft 109 is rotated, its motion will be communicated through the gears 111, 108 and the shaft 107 to the conical supporting member 112. Mounted upon and secured to the conical supporting member 112 is a spiral metal conveyor 117, the outer edge of which is sharpened, as shown at 118. Shredding devices as illustrated by the tongues 119 are struck outwardly from the spiral conveyor 117, so that they project from that side of the spiral conveyor nearest to the frame member 26.

The stalks of cane are now delivered from the substantially horizontal conveyors 69 in such manner as to fall upon the ends of the spiral conveyors adjacent to the frame member 28. These spiral conveyors are rotated in a direction such that the stalks of cane falling thereon are moved toward the free ends of the spiral conveyors, that is, toward the frame member 26. A shield 120, supported by suitable uprights 121 extending upwardly from the frame member 27, may be used for insuring the proper delivery of the stalks of cane to the spiral conveyors. To prevent the lower ends of the stalks of cane being carried forward faster than the upper ends by reason of their earlier engagement with the two front spiral conveyors, I prefer to have the first, and in some cases, the second conveyor terminate at the points shown in dotted outline in Figure 1.

When a stalk of cane drops upon the ends of the spiral conveyors adjacent to the horizontal conveyors, the friction between the stalk and the contacting portions of the spiral conveyors will be sufficient to cause the stalk of cane to move toward the rear end of the harvester as it progresses across the harvester. This movement will be expedited by the engagement of the tongues 119 with the leaves of the stalk. The tongues 119 or other devices of like character will not only tend to move the stalks of cane in a rearward direction, but will also strip the leaves from the stalks as the latter progress across the harvester. This stripping action will be assisted by the sharp edges 118 of the spiral conveyors, so that by the time a cane stalk has moved to the free ends of the spiral conveyors, it will be substantially stripped of its leaves, except perhaps for a small bunch located at the top of the stalk. The heads of the stalks, with whatever leaves may remain at the tops of the stalks will engage a guide trough 122, which extends transversely across the rear end of the machine, just behind the last spiral conveyor. This guide trough 122 is open at the forward side, to receive the heads of the stalks. The forward or open side of the trough is wide enough to receive any and all of the heads which may be projected against it, except at the extreme delivery end of the trough, where it narrows down so as to bring all of the heads into a plane such that they may be severed by the knife or saw 125.

The means for severing the tops of the stalks comprises the saw shaft 123 which is journaled on the brackets 124 projecting inwardly from the frame member 26. The saw 125 is mounted on the rear end of the shaft 123 and positioned so as to sever the tops 126 from the stalks 73 as the latter are forced off the supporting members 112 by the spiral conveyors 117. One or more additional saws such as 127 are provided for cutting each stalk of cane into two or more lengths for the purpose of facilitating transportation and milling of the cane.

To prevent the cane from being forced upwardly and over the convolutions of the spiral conveyor, I prefer to provide a plurality of guards 128 which project inwardly over the free ends of the spiral conveyors. These guards are loosely supported by a shaft 129 extending parallel with the frame member 26 and supported from the latter by means of suitable brackets 130. One of the valuable features of my invention is the arrangement for supporting and driving the spiral conveyors wholly from that side of the machine on which the frame members 27 and 28 are located, the object of my invention in this regard being to leave the opposite ends of the spiral conveyors wholly free from bearings or supporting or driving mechanisms, which, if present, would tend to accumulate leaves and trash to such an extent as to interfere with the proper delivery of the cane stalks from the spiral conveyors, if not, indeed, to clog and stop the operation of the machine entirely. By the means of my invention I avoid at every point the provision of obstructions in the form of driving or supporting or guiding mechanisms, which would tend to choke up with leaves or trash and thus interfere with the continued functioning of the machine in accordance with its plan of operation.

As illustrative of one of the several means of delivering the cane stalks from the machine, I have shown a pair of cradles 131, suspended from the shaft 129 by means of the brackets 132. These hangers are keyed to the shaft 129 so that when the latter is rotated in a proper direction, the cradles may be moved to the proper position for discharging the cane stalks therefrom. For moving the shaft 129, I provide a suitable handle 133 (see Fig. 3) which may have any conventional means 134 for locking the lever 133 to a suitable sector 135.

Owing to the provision of the cradles 131, the harvester can be operated until a sufficient number of stalks has been collected in these cradles to form a convenient bundle to be carried to the carts by which the cane is transported either to a railway or to the mill. The cradles can be dumped in windrows at intervals to provide bundles of convenient size. Other means of delivering the stalks, as for example to a cart or wagon, could be provided, either in the form of an elevator or conveyor.

Having thus described the elements of my improved harvester which directly engage and handle the cane, I shall now describe the means for driving these various elements from the engine or motor 33.

Referring now to Figures 4 and 5, I have therein shown the engine shaft 136 as being provided with a suitable fly wheel 137 and extending across the transmission housing 25 in which it is suitably journaled in bearing blocks 138 and 139. A gear 140 is secured to the rear end of the engine shaft 136 and meshes with the gear 141 which is rotatably mounted upon the front end of the saw shaft 123, and which may be connected with the latter through a suitable clutch 142 which may be of conventional design and operated by the lever 143. By manipulating the lever 143, the operator may throw the clutch 142 in and out so as to render the saw shaft 123 operative or inoperative, as may be desired.

The countershaft 144 extends longitudinally of the transmission housing 25 and is supported by suitable bearing blocks 145 and 146 carried by the housing. The end of this shaft adjacent to the engine shaft 136 is provided with a bevel gear 147 which is constantly in mesh with two bevel pinions 148 and 149, respectively, which pinions are rotatably mounted upon the shaft 136 and held against longitudinal movement thereon by any suitable means. The pinions 148 and 149 are provided with the toothed clutch elements 150 and 151, respectively. A clutch sleeve 152 is slidably mounted upon the shaft 136 between the clutch elements 150 and 151 and is provided at each end with teeth for co-acting with the teeth on the adjacent clutch element. A lever 153 provided with suitable detent mechanism may be used for holding the clutch sleeve in either its neutral, forward, or reverse position. In Figure 5, the clutch is illustrated in its "forward" position. From the above description, it will be apparent that when the clutch sleeve 152 is engaged with clutch element 151, shaft 144 would be rotated in one direction, and that when clutch sleeve 152 is engaged with clutch element 150, the shaft 144 will be rotated in the opposite direction.

Two clutch elements 154 and 155, respectively, are rotatably mounted upon the shaft 144 in spaced relation, suitable means being provided for preventing longitudinal movement of these clutch elements upon the shaft 144. The clutch elements 156 and 157, which are adapted to coact with the clutch elements 154 and 155, respectively, are splined to the shaft 144 and provided with suitable hub elements 158 and 159, respectively. These hub elements have annular grooves 160 and 161, respectively, formed therein for receiving the pinned collars 162 and 163, respectively, projecting inwardly from the levers 164 and 165, respectively. These levers are pivotally mounted upon the transmission housing, as indicated at 166, and are provided with bifurcations passing around the hub members 158 and 159. The ends of the levers project forwardly past the clutch members 154 and 155 and are provided at their ends with irregularly curved portions presently to be described. The outer ends of the levers 164 and 165 are normally urged together by a tension spring 168, thereby normally holding the respective clutches out of engagement.

A vertically disposed shaft 169 extends upwardly through the housing 25 and is journaled thereon, the lower end of the shaft carrying a cross arm 170, while the upper end of the shaft carries a handle 171 by means of which the cross arm can be operated. The portions 172 of the inner contours of the ends of the respective levers 164 and 165 are conformed arcuately about the axis of the shaft 169. Rearwardly and forwardly of these portions, the contours are curved outwardly to greater distances from the axis of the shaft 169. The cross arm 170 is of such radial length that when in the transverse position shown in Figure 5, the ends of the cross arm engage the portions 172 to hold the levers 164 and 165 apart against the tension of the spring 168, thus holding both the clutches in engagement. It will also be noted from Figure 5 that when the cross arm is in such transverse position, its ends contact the rearward ends of the arcuate portions 172. In other words, the portions 172 lie forwardly of the cross arm 170 when the latter is in a transverse position.

Two jack shafts 177 and 178 are mounted in aligned relation in the transmission housing. The first of these shafts is supported by the bearing brackets 179 and 180, and the second shaft is supported by the bearing brackets 181 and 182. The inner end of the shaft 177 is connected in driving relation with the clutch element 154 by means of the sprocket chain 183 which passes around the sprocket wheel 184 secured to the clutch element 154 and the sprocket 185 secured to the shaft 177. In a similar manner, the shaft 178 is driven by means of the sprocket chain 186 which passes around the sprocket wheel 187 secured to the clutch element 155 and the sprocket 188 secured to one end of the shaft 178. The outer end of the shaft 177 carries a pinion 189 which meshes with the gear 190 rotatably mounted on the stub shaft 47. This gear is in effect integral with the sprocket pinion 191. This sprocket pinion is in turn connected with the sprocket wheel 192 by means of the sprocket chain 193. The sprocket wheel 192 is keyed, or otherwise secured, to the forward shaft 48, the wheel 49 on which drives the traction element 44 shown on the near side of the harvester in Figure 1.

The shaft 178 has a similar driving relation with the traction element 44 shown on the far side of the harvester, and further description thereof appears to be unnecessary.

From the above description, it will be seen that when the handle 171 is turned to the left, for example, the left end (Fig. 5) of the cross arm will rise along the arcuate portion 172 of the lever 164, while the right end of the cross arm will ride forwardly off the arcuate portion 172 of the lever 165, permitting the latter lever to be moved inwardly by the spring 168, thus disengaging the clutch members 155 and 157. This obviously releases the power from the left traction element 44, whereby the latter acts somewhat as a pivot while the right traction element, still under power, drives the tractor around a left corner. Conversely, if the handle 171 is turned to the right through a slight angle, the clutch member 157 will be held in engagement while the clutch member 156 will be pulled out of engagement by the spring 168, with the result that the tractor will pivot about the right traction element to effect a right turn.

If the handle 171 is turned still farther to the right, the respective ends of the cross arms will disengage both of the arcuate portions 172 of the levers, with the result that both levers are pulled together by the spring 168, disengaging both the clutches, thereby stopping both traction elements. It is obvious that disengagement of both clutches may be effected by an extreme swinging of the lever in either direction. If the operator, when he desires to stop the tractor, swings the handle either to the right or to the left with a comparatively quick movement, the fact that one of the clutches is momentarily disengaged before the other will not result in a swinging of the tractor.

The shaft 195 is supported in the transmission housing in alignment with the shaft 144 by means of the bearing block 196 and the bearing carried by the end of the transmission housing. This shaft has secured thereto the clutch element 197 which is adapted to co-act with the clutch element 198 splined to the shaft 144, and which may be adjusted by means of a lever 199. The shaft 195 carries a bevel gear 200 which engages with the bevel pinion 201 carried by the inner end of the shaft 202. This shaft is journaled in a suitable pedestal 203 and the front side of the transmission housing 25. The front end of the shaft 202 is provided with a bevel gear 204 which drives the bevel gear 78 splined to the shaft 77 and heretofore referred to.

The shaft 195 also carries a bevel pinion 205 which meshes with the bevel gear 206 secured to the lower end of the shaft 207. This shaft is supported by a bracket 208 extending inwardly from the rear side of the transmission housing, and is journaled in the bearing 209 carried by the upper side of the transmission housing. The upper end of the shaft 207 carries a sprocket wheel 210 which is connected by means of a sprocket chain 211 with the sprocket wheel 212, which in turn is connected in driving relation with the sprocket wheel 68, so that when the shaft 207 is rotated, its movement is communicated through the sprocket gears 210, 212, and 67 to the nearer one of the conveyors 69, shown in Figure 1. A similar driving connection, not shown in detail, is provided for the other conveyor 69. This last mentioned driving connection starts with bevel pinion 205' (Figures 4 and 5), but is similar in all respects to that just described.

The upper face of the gear 206 is provided with teeth for co-acting with the bevel pinion 213, which is connected with a shaft mounted in the bracket 214 depending from the top of the transmission housing. This shaft is connected with the shaft 215 by means of a universal joint 216. The outer end of the shaft 215 is square in cross section and telescopically fits into a corresponding bore in the hollow shaft 217, which is connected with the shaft 58 by means of the universal joint 218. A similar driving connection is provided between the gear 206' and the shaft 58 on the other inclined conveyor. These universal joints and telescopic connections permit the continuance of the driving relation between the engine and conveyors 61 in whatever position the tilting frames 53 may assume in following the unevenness of the ground.

For driving the stripping means, the outer end of the shaft 195 is provided with a sprocket pinion 219 which, by means of a chain 220, drives a sprocket wheel 221 on the shaft 107 of the foremost spiral conveyor. The bevel gear 108 of the foremost shaft 107 meshes with the foremost gear 111 on the shaft 109, and in this manner drives the shaft 109, and the remaining shafts 107 connected in driving relation therewith.

I have heretofore pointed out that the driving connections between the motor, the traction elements, and the inclined conveyors are such that the horizontal component of the speed of the inclined conveyors is substantially equal to the forward movement of the traction elements or the harvester. I prefer to make the connections between the motor and the substantially horizontal conveyor 69 such that the speed of the latter conveyor is greater than the horizontal component of the speed of the inclined conveyors so as to prevent any possible clogging at the point where the cane stalks are transferred from the inclined conveyors to the horizontal conveyors. There is another advantage to this in that the swifter motion of the horizontal conveyors quickly removes the severed stalks from the edge of the cutting element, so that the severed stalks will not interfere with the cutting of the succeeding stalks.

While I have described the cutting element of my improved harvester as comprising a plurality of discs which are illustrated as being round in shape, it is to be clearly understood that my invention is not limited to discs of this shape, but is capable of making use of discs of any shape which provide cutting edges that can be projected beyond the peripheries of the clamping discs. It should also be understood that the operation of my harvester is not dependent upon the particular type of cutting element which I have described, but can make use of a simple rotating saw or knife, although it is to be understood that the cutting element which I have described has a different action from that of an ordinary saw or circular knife in that the cutting edges of the cutting discs strike the stalks while moving with a speed which is much greater than the forward speed or velocity of the harvester. The impact of the cutting edges of the cutting discs on the stalks is so sudden that the inertia of the stalks prevents any material change in the position of the stalks before they are severed. In this manner, I prevent the stalks from being bent over as they might otherwise be if a rotating saw or knife of the usual type were employed for severing them from the roots.

From the above description, it will be seen that I have provided a cane harvester which is compartively simple in construction and which can be easily operated by one or two attendants. The conveying and stripping means which I employ for removing the leaves from the stalks is of such construction and character as to make it practically impossible for the leaves stripped from the cane to clog the stripping mechanism. The most of the leaves are discharged downwardly and beneath the spiral conveyors and any leaves tending to remain in the spiral conveyors will be fed along the latter and discharged at the free ends of these conveyors, which as is shown are entirely unsupported thereby facilitating the discharge of the stalks and leaves therefrom.

While I have described the details of construction of the preferred embodiment of my invention, it is to be clearly understood that my invention is not limited to these details of construction, but is capable of other adaptations and modifications within the scope of the appended claims.

Having thus described my invention, what I claim as new and desire to secure by Letters Patent of the United States is:

1. A cane harvester comprising a transversely extending transmission housing having substantially horizontal frame members extending rearwardly therefrom in spaced relation, a traction element at each side of and supporting said housing, a caster element supporting the rear ends of said frame members, a pair of brackets projecting forwardly from said transmission housing, a supporting beam pivotally mounted upon each of said brackets, said beams being inclined downwardly and forwardly, and diverging from each other in a forward direction, a shoe and a supporting wheel carried by the forward end of each of said beams, an endless conveyor on each of said beams, said conveyors including flights, a single pair of brackets extending upwardly from said transmission housing and supporting a pair of opposed co-acting endless conveyors for receiving cane stalks from said inclined conveyors, a plurality of substantially horizontal, parallel, spiral conveyors rotatably mounted on one of said frame members and extending toward the other of said frame members, said spiral conveyors comprising leaf-stripping means, a saw shaft supported by said other frame member adjacent the discharge ends of said spiral conveyors, saws mounted upon such shaft at spaced intervals, pivotally mounted cradles carried by said other frame member and extending beneath said saw shaft, means for severing the cane stalks from the roots, other frame members extending forwardly from said transmission housing, an engine carried by said last mentioned frame members, and controllable driving connections between said engine and said traction elements, said conveyors and said saw shaft.

2. A cane harvester comprising a transversely extending transmission housing having substantially horizontal frame members extending rearwardly therefrom in spaced relation, a traction element at each side of and supporting said housing, a caster element supporting the rear ends of said frame members, a supporting beam pivotally mounted upon the transmission housing, said beams being inclined downwardly and forwardly and diverging from each other in a forward direction, a shoe carried by the forward end of each of said beams, an endless conveyor on each of said beams, said conveyors including flights, a pair of opposed co-acting endless conveyors for receiving cane stalks from said inclined conveyors, a plurality of substantially horizontal, parallel, spiral conveyors rotatably mounted on one of said frame members and extending toward the other of said frame members, said spiral conveyors comprising leaf-stripping means, a saw shaft supported by said other frame member adjacent the discharge ends of said spiral conveyors, saws mounted upon such shaft at spaced intervals, pivotally mounted cradles extending beneath said saw shaft, means for severing the cane stalks from the roots, an engine, and controllable driving connections between said engine and said traction elements, said conveyors and said saw shaft.

3. A cane harvester comprising a transversely extending transmission housing having substantially horizontal frame members extending rearwardly therefrom in spaced relation, a traction element at each side of and supporting said housing, a caster element supporting the rear ends of said frame members, a pair of pivotally mounted supporting beams, said beams being inclined downwardly and forwardly and diverging from each other in a forward direction, an endless conveyor on each of said beams, a pair of opposed co-acting endless conveyors for receiving cane stalks from said inclined conveyors, a plurality of substantially parallel, spiral conveyors rotatably mounted on one of said frame members and extending toward the other of said frame members, said spiral conveyors comprising leaf-stripping means, a saw shaft supported by said other frame member adjacent the discharge ends of said spiral conveyors, saws mounted upon such shaft at spaced intervals, means for severing the cane stalks from the roots, an engine, and controllable driving connections between said engine and said traction elements, said conveyors and said saw shaft.

4. A cane harvester comprising a transversely extending transmission housing, a traction element at each end of and supporting said housing, a frame member extending rearwardly from each end of said housing, a plurality of parallel, spiral conveyors disposed in a substantially horizontal plane and rotatably mounted on one of said frame members, said spiral conveyors comprising leaf-stripping means, and means carried by said transmission housing for severing cane stalks from the roots thereof and delivering said cane stalks to said spiral conveyors in a direction substantially at right angles to the axis of rotation of said spiral conveyors.

5. A cane harvester comprising a transversely extending transmission housing, a traction element at each end of and supporting said housing, a plurality of parallel, spiral conveyors disposed in a substantially horizontal plane, said spiral conveyors comprising leaf-stripping means, and means carried by said transmission housing for severing cane stalks from the roots thereof and delivering said cane stalks to said spiral conveyors in a direction substantially at right angles to the axis of rotation of said spiral conveyors.

6. A cane harvester comprising a transversely extending transmission housing, a traction element at each end of and supporting said housing, a plurality of parallel, spiral conveyors disposed in a substantially horizontal plane, said spiral conveyors comprising leaf-stripping means, means for severing cane stalks from the roots thereof and delivering said cane stalks to said spiral conveyors, and a common source of power for the traction elements, conveyors and severing means.

7. A cane harvester comprising means for severing the cane stalks from the roots thereof, means for receiving the cane stalks after they have been severed from the roots and delivering said stalks in a horizontal position, a plurality of spaced saws for topping and cutting said stalks into lengths, and means intermediate said delivering means and said saws for stripping the leaves from said stalks.

8. A cane harvester comprising means for severing the cane stalks from the roots thereof, means for receiving the cane stalks after they have been severed from the roots and delivering said stalks in a horizontal position, a saw for topping said stalks, and means intermediate said delivering means and said saw for stripping the leaves from said stalks.

9. A cane harvester comprising a plurality of spaced saws for topping and severing cane stalks into lengths, means for severing said cane stalks from the roots thereof, means for conveying the cane stalks from said severing means to said saws, said last mentioned means comprising means for stripping the leaves from said stalks, and a guide for aligning the tops of the cane stalks in advance of the saws.

10. A cane harvester comprising a saw for topping cane stalks, means for severing said cane stalks from the roots thereof, means for conveying the cane stalks from said severing means to said saw, said last mentioned means comprising means for stripping the leaves from said stalks, and a guide for aligning the tops of the cane stalks in advance of the saw.

11. A cane harvester comprising means for severing the cane stalks from the roots thereof, means for receiving the severed stalks and delivering them in a substantially horizontal position, common means for stripping the leaves from said stalks and for moving the stalks laterally and longitudinally for positioning the tops of said stalks in the same plane, and means for severing the tops from said stalks.

12. A cane harvester comprising means for severing the cane stalks from the roots thereof, means for receiving the severed stalks and delivering them in a substantially horizontal position, means for stripping the leaves from said stalks and for moving the stalks laterally and longitudinally for positioning the tops of said stalks in the same plane, and means for severing the tops from said stalks.

13. A cane harvester comprising a substantially horizontal frame, means supported by said horizontal frame and lying in a horizontal plane for receiving cane stalks, stripping the leaves therefrom and arranging the same relative to their top ends, means for cutting the stripped stalks into lengths measured from their top ends, and means for severing the cane stalks from the roots thereof and delivering them to said stripping means.

14. A cane harvester comprising a supporting frame, a pair of forwardly and downwardly inclined supporting beams pivotally mounted on said supporting frame, an endless conveyor mounted upon each of said supporting beams, the conveyors carried by said supporting beams being provided with co-acting flights, a second pair of oppositely disposed co-acting endless conveyors, said second pair of conveyors being carried by said supporting frame and positioned to receive cane stalks from said first mentioned pair of conveyors, each of the conveyors of said second pair comprising a link chain and a compressible friction band carried by said links, said friction band being arranged to grasp the cane stalks therebetween and to lift said cane stalks as said cane stalks are received therebetween, flights carried by said links, the flights of one link chain being staggered with relation to the flights of the other link chain, common means for driving said pairs of conveyors, the connections between said driving means and said conveyors being such that the second pair of conveyors operates at a greater horizontal velocity than said first pair of conveyors.

15. A cane harvester comprising a supporting frame, a pair of forwardly and downwardly inclined supporting beams pivotally mounted on said supporting frame, an endless conveyor mounted upon each of said supporting beams, a second pair of oppositely disposed co-acting endless conveyors, said second pair of conveyors being carried by said supporting frame and positioned to receive cane stalks from said first mentioned pair of conveyors, each of the conveyors of said second pair comprising a link chain and a compressible friction band carried by said links, said friction band being arranged to grasp the cane stalks therebetween and to lift said cane stalks as said cane stalks are received therebetween, common means for driving said pairs of conveyors, the connections between said driving means and said conveyors being such that the second pair of conveyors operates at a greater horizontal velocity than said first pair of conveyors.

16. A cane harvester comprising a supporting frame, a pair of forwardly and downwardly inclined supporting beams pivotally mounted on said supporting frame, an endless conveyor mounted upon each of said supporting beams, a second pair of oppositely disposed co-acting endless conveyors, said second pair of conveyors being carried by said supporting frame and positioned to receive cane stalks from said first mentioned pair of conveyors, each of the conveyors of said second pair comprising a link chain and a compressible friction band carried by said links, said friction band being arranged to grasp the cane stalks therebetween, and means for driving said pairs of conveyors.

17. In a cane harvester, the combination of means for severing the cane stalks from the roots thereof, a pair of forwardly and downwardly inclined conveyors positioned ahead of said severing means, means for moving said conveyors bodily forward and for operating the severing means, and means for driving said conveyors at a speed such that the horizontal component of the velocity of the conveyors is equal to the rate of movement of the conveyors bodily forward.

18. A cane harvester comprising means for receiving the cane stalks and stripping the leaves therefrom, means for severing the cane stalks from the roots thereof, a pair of forwardly and downwardly inclined conveyors pivotally mounted ahead and independently of said severing means, and means for driving said conveyors.

19. A cane harvester comprising a supporting frame, a pair of oppositely disposed forwardly and downwardly inclined conveyors pivotally mounted upon said supporting frame, means for causing the lower ends of the conveyors to follow the contour of the ground irrespective of movements of the frame, a motor for moving said supporting frame and for driving said conveyors, and driving connections between said motor and each of said conveyors, said driving connections each including a pair of telescoping shafts.

20. A cane harvester comprising means for receiving the cane stalks and stripping the leaves therefrom, means for severing the cane stalks from the roots thereof, a pair of forwardly and downwardly inclined conveyors positioned ahead of said severing means, means for driving said conveyors, and means for causing the lower ends of said conveyors to follow the contour of the ground.

21. A cane harvester comprising a supporting frame, a pair of oppositely disposed forwardly and downwardly inclined conveyors pivotally mounted upon said supporting frame, wheels for supporting the forward ends of the conveyors in substantially constant relation to the ground, a motor for moving said supporting frame and for driving said conveyors, and driving connections between said motor and said conveyors.

22. A cane harvester comprising a vehicle; and a motor for propelling the vehicle, said vehicle carrying a cutter for severing the cane stalks from the roots, a vertical conveyor for carrying the severed stalks from the cutter and tipping the same from a vertical to a substantially horizontal position, a horizontally disposed conveyor for receiving the stalks from the vertical conveyor then carrying the same laterally and rearwardly of the vehicle and at the same time stripping the stalks of leaves, an aligner against which the tops of the stalks abut during their lateral movement to arrest the rearward movement and thus align the stalks relative to their tops, and a cutter for removing the tops from the stalks as they are carried along by the horizontal conveyor.

23. A cane harvester comprising a vehicle; and a motor for propelling the vehicle, said vehicle carrying a cutter for severing the cane stalks from the roots, a vertical conveyor for carrying the severed stalks from the cutter and tipping the same from a vertical to a substantially horizontal position, a horizontally disposed conveyor for receiving the stalks from the vertical conveyor then carrying the same laterally and rearwardly of the vehicle and at the same time stripping the stalks of leaves, an aligner against which the tops of the stalks abut during their lateral movement to arrest the rearward movement and thus align the stalks relative to their tops, and a cutter for removing the tops from the stalks as they are carried along by the horizontal conveyor; and driving connections between the motor and the cutters and conveyors whereby the same are operated by the motor while it is propelling the vehicle.

24. A cane harvester comprising a vehicle; and a motor for advancing the vehicle, said vehicle carrying a cutter for severing the cane stalks from the roots, an advance conveyor for supporting the cane during the cutting operation, a vertical conveyor for taking the severed stalks in a vertical position after cutting and moving them rearwardly of the vehicle into a substantially horizontal position, a series of parallel horizontal spiral rotary conveyors onto which the stalks are delivered by the vertical conveyor and by which the stalks are moved transversely and rearwardly of the vehicle and at the same time stripped of leaves, an aligner cooperating with their spiral conveyors for gauging the stalks relative to their tops, and a cutter for removing the tops.

25. A cane harvester comprising a vehicle; and a motor for advancing the vehicle, said vehicle carrying a cutter for severing the cane stalks from the roots, an advance conveyor for supporting the cane during the cutting operation, a vertical conveyor for taking the several stalks in a vertical position after cutting and moving them rearwardly of the vehicle into a substantially horizontal position, a series of parallel horizontal spiral rotary conveyors onto which the stalks are delivered by the vertical conveyor and by which the stalks are moved transversely and rearwardly of the vehicle and at the same time stripped of leaves, an aligner cooperating with the spiral conveyors for gauging the stalks relative to their tops, and a cutter for removing the tops; and driving connections interconnecting the vehicle propelling motor with the cutters and conveyors.

26. A cane harvester having a cutter for severing the stalks from their roots, means for tipping the normally vertical stalks into a substantially horizontal position, a series of spiral conveyors for receiving the stalks from said means supporting the stalks in a relatively horizontal position while moving the same laterally and lengthwise in the direction of the tops and at the same time stripping the leaves therefrom, means against which the tops of the stalks abut during their lateral and lengthwise movements upon the spiral conveyors so as to gauge the stalks relative to the tops thereof, and cutters for removing the tops and severing the stalks into lengths at fixed distances from the tops.

27. A cutting element for a cane harvester comprising two discs, a plurality of smaller discs adjustably positioned between said first mentioned discs in such manner that any portion of the periphery of said smaller discs may extend beyond the peripheries of said first mentioned discs, means for clamping said first mentioned discs upon said smaller discs, all of said discs being provided with registering openings for receiving screws for securing said smaller discs to said first mentioned discs.

28. A cutting element for a cane harvester comprising two discs, a plurality of smaller discs adjustably positioned between said first mentioned discs in such manner that any portion of the periphery of said smaller discs may extend beyond the peripheries of said first mentioned discs, and means for clamping said first mentioned discs upon said smaller discs.

29. A cutter element for a cane harvester comprising a pair of discs, a plurality of cutting discs positioned between said pair of discs, and adjustable means for clamping such cutting discs between said pair of discs with any desired portions of the peripheries of said cutting discs projecting beyond the peripheries of said pair of discs.

30. A cutter element for a cane harvester comprising a disc, a plurality of cutting discs carried by said disc, and adjustable means for securing said cutting discs to said disc with any desired portions of the peripheries of said cutting discs projecting beyond the periphery of said disc.

31. A cutting element for a cane harvester comprising a shaft, a supporting element secured to one end of said shaft, and a plurality of cutting discs adjustably mounted upon said supporting element in such manner that substantially all portions of the cutting edges of said cutting discs can be brought into operative positions.

32. In a cane harvester, the combination of a rigid frame member, a hollow axle rigidly mounted in said frame and projecting laterally therefrom, a drive shaft extending through said hollow axle and journalled therein, and a spiral conveyor having a hollow tubular core journalled upon said axle at or near said frame and connected with said drive shaft beyond the end of said hollow axle, a part of said spiral conveyor being extended beyond the end of said hollow axle.

33. In a cane harvester, the combination of a rigid box-like frame member, a hollow tubular axle rigidly mounted in and supported by said frame member and projecting laterally from said frame member, a drive shaft journalled in said hollow tubular axle and extending throughout the length and projecting beyond the ends of said hollow tubular axle, means for applying power to the frame end of said drive shaft to rotate it, a spiral conveyor rotatably mounted upon said hollow tubular axle and projecting beyond the free end thereof, and means connecting the free end of said drive shaft with said spiral conveyor to rotate the latter about said axle.

34. In a cane harvester, the combination of means for severing the cane stalks from the roots thereof, means for receiving the cane stalks after they have been severed from their roots and delivering them in horizontal positions, means for conveying the severed and delivered stalks and for stripping the leaves therefrom in a direction laterally with respect to said stalks, means for bringing said laterally conveyed stalks into substantially endwise alignment, and means for severing the tops from the stalks when thus delivered horizontally in substantially endwise alignment.

35. A cane harvester comprising means for severing the cane stalks from the roots thereof, means for receiving the cane stalks and conveying them in a substantially horizontal position, stripping the leaves therefrom and at the same time arranging said stalks to bring the tops thereof into substantially the same plane, and means for severing the tops from the stalks.

36. A cane harvester comprising means for severing the stalks from the roots, means for aligning the stalks relative to the top ends, means for severing the tops from these stalks, and means intermediate said two first mentioned means for stripping the leaves from the stalks while the stalks are held in a horizontal position.

37. A cane harvester comprising a plurality of spaced parallel rotary conveyors supported entirely from one end so as to leave the other end free from obstruction, means for severing the stalks from the roots, and means for conveying the severed stalks to said rotary conveyors.

38. A cane harvester comprising a plurality of rotatably mounted substantially cylindrical elements each of said elements being provided with a substantially spiral conveyor element and a support for carrying each element entirely at one end leaving the opposite end unobstructed.

39. A cutting device for a cane harvester comprising a rotatable supporting member, and a series of circular cutters carried by said member and arranged in spaced relation about the axis of rotation.

40. A cane harvester comprising means for severing the stalks from the roots thereof, means for receiving the cane stalks after they have been severed from the roots and delivering said stalks in a horizontal position, an aligner for positioning the stalks relative to the tops thereof, and means for topping said stalks when in said horizontal position.

41. A cane harvester comprising means for severing the cane stalks from the roots thereof, means for receiving the severed stalks and delivering them in a substantially horizontal position, means for stripping the leaves from said stalks and for positioning the tops of said stalks in the same plane, and means for severing the tops from said stalks when the stalks are in the horizontal position.

42. A cane harvester comprising a supporting beam, a pair of forwardly and downwardly supporting beams pivotally mounted on said supporting frame, an endless conveyor mounted upon each of said supporting beams, a second pair of oppositely disposed co-acting endless conveyors, said second pair of conveyors being positioned to receive cane stalks from said first mentioned pair of conveyors, and means for driving the second pair of conveyors at a greater horizontal velocity than the first pair of conveyors.

43. In a cane harvester, the combination of a vehicle frame, an upwardly and backwardly inclined first conveyor adapted, as the vehicle frame moves forwardly, to engage cane stalks before they are severed from their roots, means for severing the stalks from their roots, means for driving the first conveyor at a speed whose horizontal component shall be substantially equal to the velocity of forward movement of the vehicle frame, a second conveyor running in a plane more nearly horizontal than that of the first conveyor and adapted to engage the cane stalks upon their delivery from the first conveyor and to carry the tops of the stalks backward more rapidly than the bottoms of the stalks, whereby the stalks are turned into a substantially horizontal position, and means for stripping and topping the stalks when in the said horizontal position.

44. In a cutting device for a cane harvester, a supporting member rotatable in substantially a horizontal plane, and a plurality of knife-like cutting blades mounted upon said supporting member, the knife-like cutting edges of said knives being inclined at an angle to the radius of rotation but yet not substantially co-incident with the circumference of the circle in which the knives rotate, whereby the edge of the knife will be drawn across the stalk to be severed from its roots.

45. In a device of the class described, the combination of a pair of oppositely disposed and substantially parallel running conveyors having resilient faces adapted to yield and thus firmly to grip stalks or bunches of stalks of varying size and shape, said resilient faces having an upward bias so as to put tension on the stalks.

46. In a device of the class described, the combination of opposed conveyor elements, each of the opposed faces of the said conveyor elements being shod with resilient grips adapted to yield greater or less distances upwardly and outwardly in response to the pressure of stalks and bunches of stalks of differing size as they are engaged between the oppositely disposed conveyors.

47. A cane harvester having means for severing the stalks from their roots and then tipping the stalks into a substantially horizontal position, and a series of horizontally disposed rotatable spiral conveyors, each of said conveyors having bearings supported entirely at one end of the conveyor so that the opposite end is unobstructed for the delivery of stalks therefrom.

48. A cane harvester having means for severing the stalks from their roots and delivering the severed stalks in a subtsantially horizontal position, a series of spiral stalk-supporting conveyors onto which the stalks are delivered, each conveyor having bearings supported entirely at one end of the conveyor and leaving the other end unobstructed, means for rotating the conveyors, and a top removing cutter located adjacent the unobstructed end of one of the conveyors.

49. A cane harvester having means for severing the stalks from their roots and tilting the stalks from a vertical into a substantially horizontal position, a plurality of rotatable spiral conveyors upon which the stalks lie in a substantially horizontal position, the rotation of the spiral conveyors removing the leaves from the stalks and moving the stalks both laterally and longitudinally in the direction of their tops, bearings for the conveyors supported wholly at one end of the conveyors so as to leave the opposite ends unobstructed, a cutter for removing the tops from the stalks, and an aligner for gauging the position of the stalks and top-removing cutter relative to the tops of the stalks.

50. In a cane harvester, means for severing the stalks from their roots, a plurality of spiral conveyors disposed in a horizontal plane adapted to receive the severed stalks, means for rotating the conveyors causing a positive lateral movement and a frictional longitudinal movement of the stalks, and means for limiting longitudinal movement of the stalks when endwise alignment of the tops is attained.

In witness whereof, I hereunto subscribe my name this 29 day of February, 1924.

ISAAC H. ATHEY.

CERTIFICATE OF CORRECTION.

Patent No. 1,741,602.                       Granted December 31, 1929, to

ISAAC H. ATHEY.

It is hereby certified that error appears in the printed specification of the above numbered patent requiring correction as follows: Page 11, lines 39 and 40, claim 34, strike out the words "and for stripping the leaves therefrom" and insert the same to follow after the word "stalks" in line 40, same claim; and that the said Letters Patent should be read with this correction therein that the same may conform to the record of the case in the Patent Office.

Signed and sealed this 18th day of February, A. D. 1930.

(Seal)

M. J. Moore,
Acting Commissioner of Patents.